(12) United States Patent
Judson et al.

(10) Patent No.: US 7,181,244 B2
(45) Date of Patent: Feb. 20, 2007

(54) METHOD AND APPARATUS FOR USING POSITION LOCATION TO DIRECT NARROW BEAM ANTENNAS

(75) Inventors: Bruce A. Judson, San Luis Obispo, CA (US); Christopher C. Riddle, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 4 days.

(21) Appl. No.: 09/998,860

(22) Filed: Nov. 15, 2001

(65) Prior Publication Data

US 2002/0111174 A1 Aug. 15, 2002

Related U.S. Application Data

(60) Provisional application No. 60/249,870, filed on Nov. 16, 2000.

(51) Int. Cl.
*H04M 1/00* (2006.01)
(52) U.S. Cl. .............................. 455/562.1; 455/456.1; 455/524
(58) Field of Classification Search ................ 455/456, 455/562, 561, 13.1, 440, 427, 457, 562.1, 455/101, 524; 342/367, 357.1, 360; 370/490; 343/895
See application file for complete search history.

(56) References Cited

U.S. PATENT DOCUMENTS

| | | | | |
|---|---|---|---|---|
| 5,615,409 A * | 3/1997 | Forssen et al. | ............. | 455/440 |
| 5,857,155 A * | 1/1999 | Hill et al. | .................... | 455/456 |
| 6,026,304 A * | 2/2000 | Hilsenrath et al. | ....... | 455/456.2 |
| 6,070,079 A * | 5/2000 | Kuwahara | ................... | 455/456 |
| 6,115,409 A * | 9/2000 | Upadhyay et al. | .......... | 375/144 |
| 6,122,260 A * | 9/2000 | Liu et al. | ..................... | 370/280 |
| 6,141,542 A | 10/2000 | Kotzin et al. | ............... | 455/101 |
| 6,232,918 B1 * | 5/2001 | Wax et al. | ................... | 342/360 |
| 6,249,680 B1 * | 6/2001 | Wax et al. | ............... | 455/456.2 |
| 6,317,586 B1 * | 11/2001 | Haardt | ...................... | 455/67.6 |
| 6,512,481 B1 * | 1/2003 | Velazquez et al. | .......... | 342/367 |
| 6,538,601 B2 * | 3/2003 | Bruno et al. | ............. | 342/357.1 |
| 6,593,880 B2 * | 7/2003 | Velazquez et al. | .......... | 342/367 |
| 6,731,954 B1 * | 5/2004 | Katz | ...................... | 455/562.1 |

(Continued)

FOREIGN PATENT DOCUMENTS

WO 9816077 4/1998

*Primary Examiner*—Tilahun Gesesse
(74) *Attorney, Agent, or Firm*—Philip R. Wadsworth; Bruce W. Greenhaus; Donald C. Kordich (57) ABSTRACT

A novel mobile unit which communicates with a new and advantageous base station. The mobile unit includes a system for generation of position information and a transceiver for transmitting the position information. In the preferred embodiment, the transceiver is a CDMA system and the system for generating position information includes an arrangement for receiving a GPS signal. In the preferred embodiment, a GPS assisted arrangement is employed which is adapted to receive a signal from an airborne platform as well as from a satellite based platform. The inventive base station is adapted to receive position information from a remote unit and provide a received position signal in response thereto. The novel base station is further equipped with a mechanism for directing a beam in response to the received position signal. In the illustrative embodiment, the mechanism for directing the beam is a smart antenna system including an antenna array and a beamforming network for driving the array to output the directed beam.

3 Claims, 8 Drawing Sheets

U.S. PATENT DOCUMENTS 6,751,206 B1* 6/2004 Padovani et al. ........... 370/335
6,850,761 B2* 2/2005 Pallonen .................... 455/437
6,980,527 B1* 12/2005 Liu et al. .................... 370/280
2002/0147032 A1* 10/2002 Yoon et al. ................. 455/562

* cited by examiner

METHOD AND APPARATUS FOR USING POSITION LOCATION TO DIRECT NARROW BEAM ANTENNAS

RELATED APPLICATIONS

This application claims priority to U.S. Provisional Application No. 60/249,870, filed on Nov. 16, 2000.

BACKGROUND OF THE INVENTION

1. Field of the Invention

The present invention relates to communications systems and methods. More specifically, the present invention relates to systems and methods for improving the performance of cellular telephone systems.

2. Description of the Related Art

Smart antennas are arrays of antenna elements, each of which receive a signal to be transmitted with a predetermined phase offset. The net effect of the array is to direct a (transmit or receive) beam in a predetermined direction. The beam is steered by controlling the phase relationships of the signals which excite the elements of the array. Thus, smart antennas direct a beam to each individual user (or multiple users) as opposed to radiating energy to all users within a predetermined coverage area (e.g., 120°) as per conventional antennas. Smart antennas increase system capacity by decreasing beam width and thereby decreasing interference. With a reduction in interference, increases in signal-to-interference and signal-to-noise ratios result allowing for improved performance and/or capacity. This can result in a reduction of the transmit power for a given level of performance.

While smart antennas are effective to improve capacity, one problem associated with the use of smart antennas is that of locating the user to whom a given beam is to be directed. In the reverse link, the angle of arrival of energy transmitted by the user is used to calculate the user's position by triangulation or other suitable technique. Unfortunately, current techniques for calculating angle of arrival information are computationally intensive.

In addition, this system works well in environments where energy is received from the user via a straight line. Unfortunately, in some environments (e.g. urban) this condition does not hold as the signal is often reflected off buildings and other structures and received as a multipath beam.

Hence, a need remains in the art for a system or method for increasing system capacity for cellular telephone systems. Specifically, there is a need in the art for a system or method for ascertaining the position of a user in a cellular telephone system equipped with smart antennas.

SUMMARY OF THE INVENTION

The need in the art is addressed by the teachings of the present invention. The inventive system includes a novel mobile unit which communicates with a new and advantageous base station. The mobile unit includes a system for generation of position information and a transceiver for transmitting the position information. In the preferred embodiment, the transceiver is a CDMA (Code Division Multiple Access) system and the system for generating position information includes an arrangement for receiving a Global Positioning System (GPS) signal.

The inventive base station is adapted to receive position information from a remote unit and provide a received position signal in response thereto. The novel base station is further equipped with a mechanism for directing a beam in response to the received position signal. In the illustrative embodiment, the mechanism for directing the beam is a smart antenna system including an antenna array and a beamforming network for driving the array to output the directed beam.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 2A:
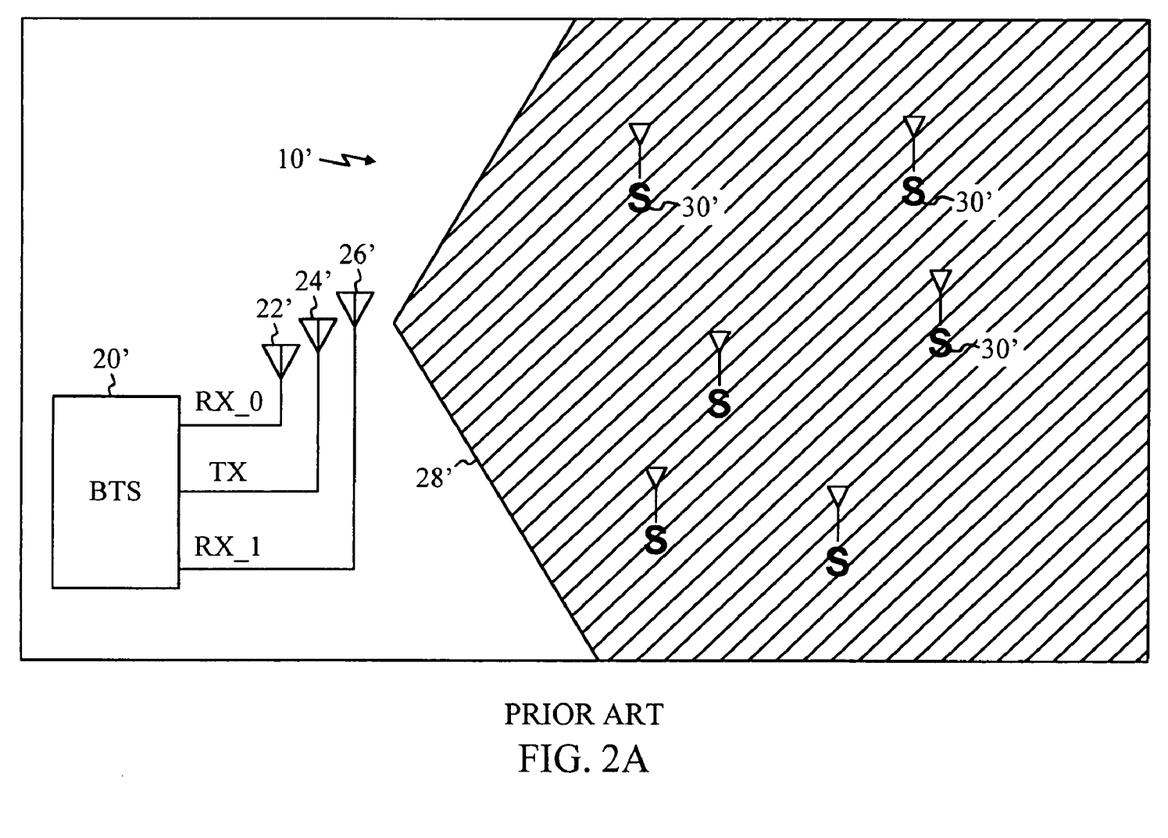
FIG. 2A is a block diagram showing one sector of a basic conventional cellular system.

FIG. 2A is a block diagram showing one sector of a basic conventional cellular system. The system 10' includes a base station 20' which transmits and receives signals to and from a plurality of subscriber units 30' utilizing the three sector antennas 22', 24' and 26', respectively. Each antenna is designed to provide a 120° sector of coverage 28'. The area of coverage provided by the three antennas in FIG. 2A is shaded. Three antennas sets are typically used to provide 360° coverage required for each cell. In FIG. 2A, the base station 20' uses one transmit (forward link) antenna 24' and two diversity (return link) antennas, 22' and 26' as is common in the art. While this approach has been used effectively to date, the capacity thereof has been somewhat limited. As mentioned above, smart antennas are being utilized to increase the capacity of a cellular telephone.

Figure 1:
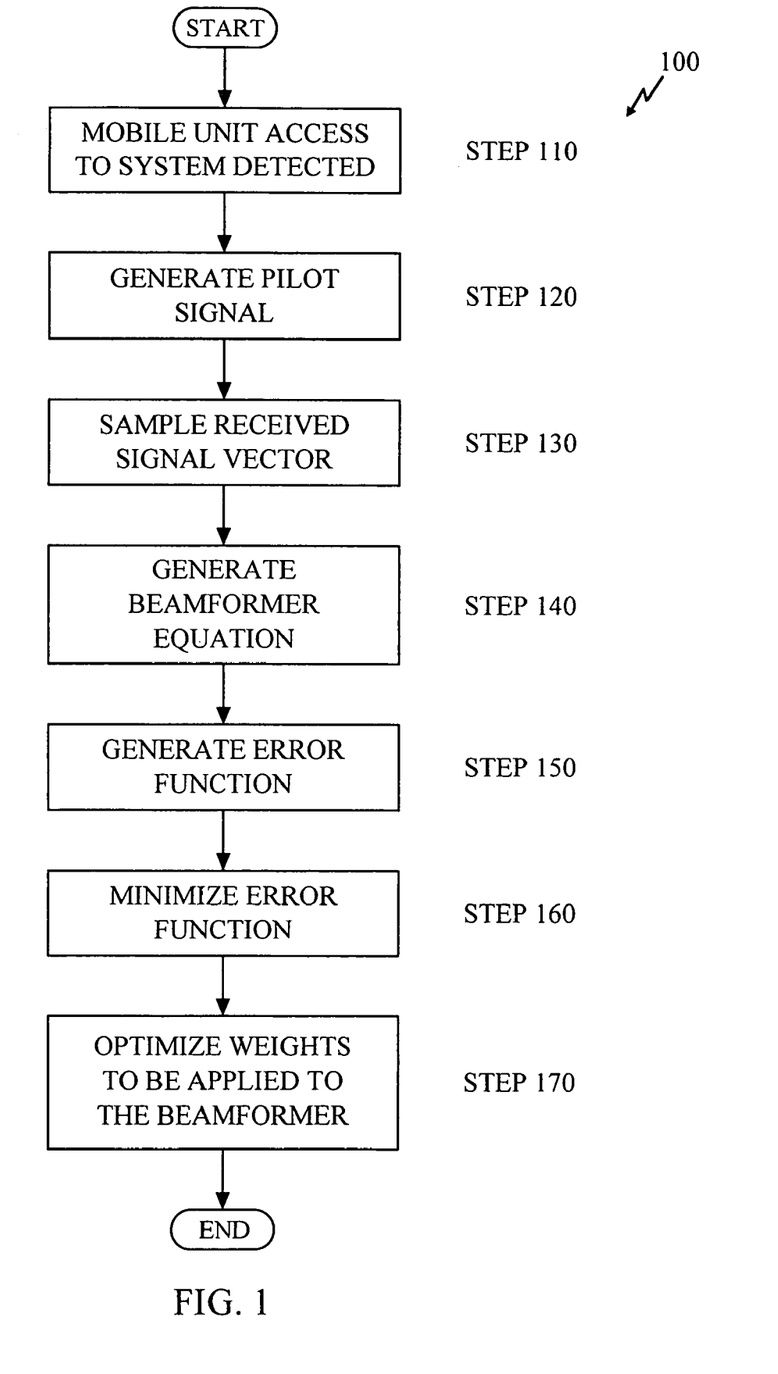
FIG. 1 is a flow diagram of one such beamforming algorithm implemented in accordance with a conventional Minimum Mean Squared Error Algorithm.
Figure 2B:
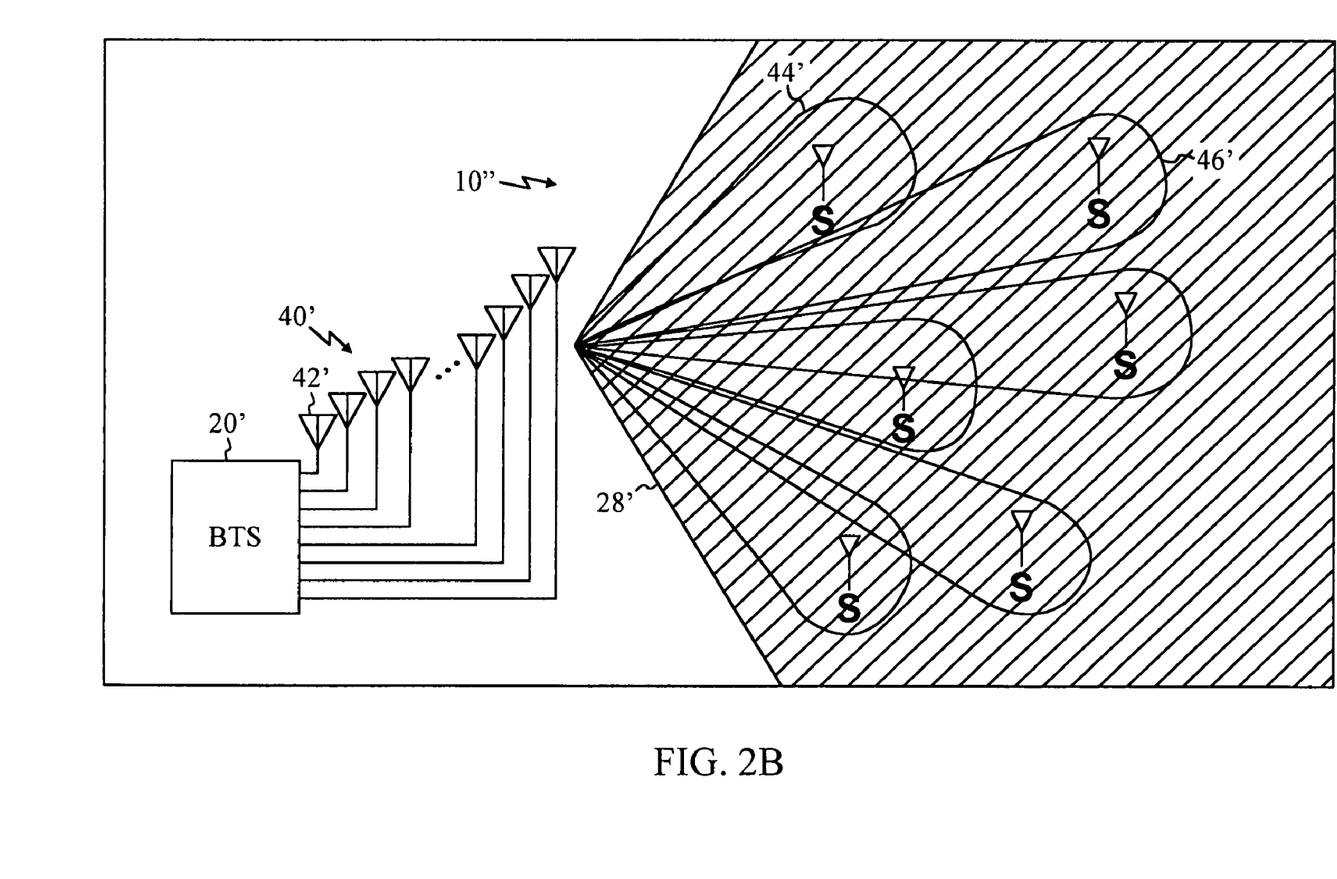
FIG. 2B is a diagram of a cellular telephone system utilizing a smart antenna system.

FIG. 2B is a diagram of a cellular telephone system utilizing a smart antenna system. The system 10" of FIG. 2 is similar to that shown in FIG. 1 with the exception of a smart antenna array 40' in lieu of the three sector antennas 22', 24', and 26' of FIG. 2A. The coverage sector 28' of the conventional system depicted in FIG. 2A is shown for comparison. As shown in FIG. 2B, smart antennas are arrays of antenna elements 42', each of which receive a signal to be transmitted with a predetermined phase offset. The net effect of the array 40' is to direct a transmit or receive beam 44' in a predetermined direction. Each beam is controllable by controlling the phase relationships of the signals used to excite (or received from) the elements 42' of the array 40'. Thus, smart antennas direct a beam to each individual user as opposed to radiating energy to (or receiving energy from) all users within a predetermined coverage area (e.g., 120°) as per conventional antennas. Hence, smart antennas increase system capacity by decreasing beam width and thereby decreasing interference. With a reduction in interference, an increase in signal-to-interference and signal-to-noise ratio result allowing for improved performance and/or capacity.

However, as mentioned above, while smart antennas are effective to improve capacity, one problem associated with the use of smart antennas is that of locating the user to whom a given beam is to be directed. In the reverse link, the angle of arrival of energy transmitted by the user is used to calculate the user's position by triangulation or other suitable technique. Unfortunately, current techniques for calculating angle of arrival information are computationally intensive.

Unfortunately, in some environments (e.g. urban environments) this condition does not hold as the signal is often reflected off of buildings and other structures and received as a multipath beam.

Hence, a need continues to exist in the art for a system or method for increasing system capacity for cellular telephone systems. Specifically, there is a need in the art for a system or method for ascertaining the position of a user in a cellular telephone system equipped with smart antennas. This need is addressed by the teachings of the present invention. The inventive system includes a novel mobile unit which communicates with a new and advantageous base station.

Figure 3:
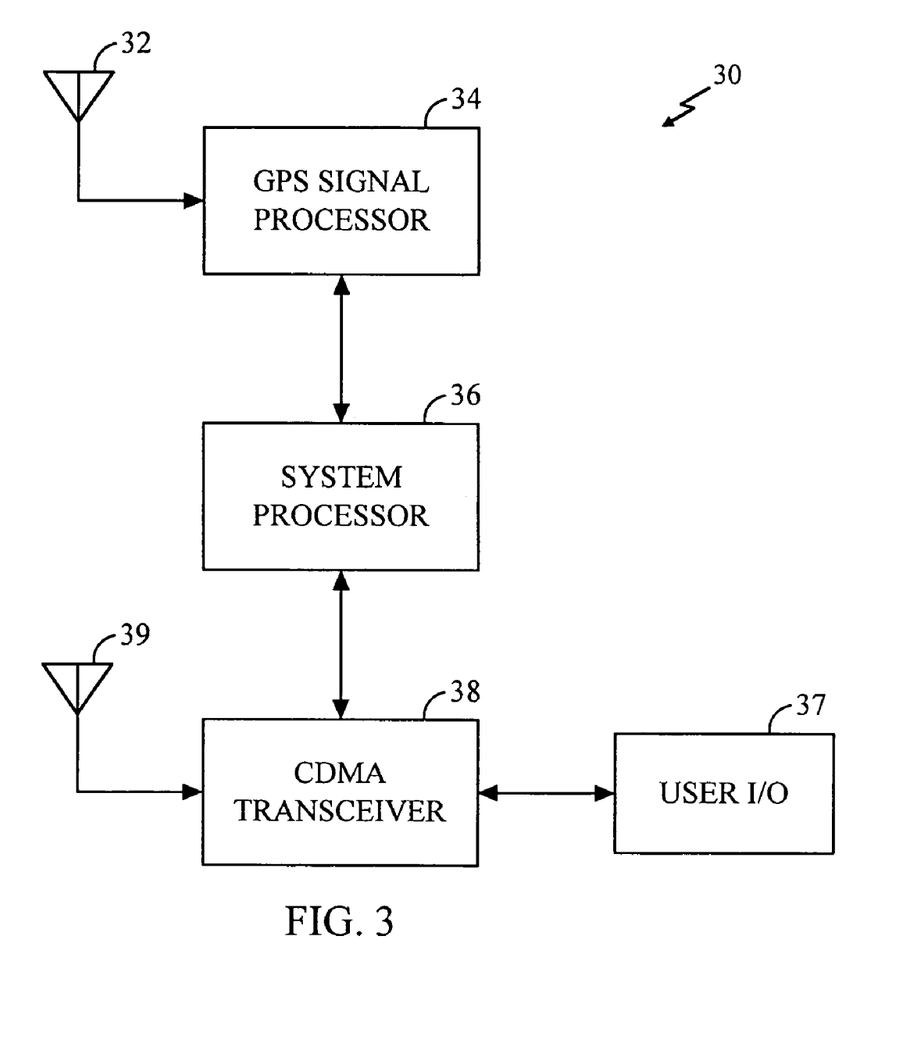
FIG. 3 is a block diagram of a mobile unit in accordance with the present teachings.

FIG. 3 is a block diagram of an illustrative implementation of a mobile unit in accordance with the present teachings. The mobile unit 30 includes a first antenna 32 adapted to receive position location signals from a remote system such as the Global Positioning System. Signals from the GPS antenna 32 are processed by a GPS signal processor 34. The GPS processor 34 outputs position data to a system controller 36 which selectively multiplexes the position data with provided via a user interface 37 for transmission by a transceiver 38. In the preferred embodiment, the transceiver 38 is a code division multiple access transceiver. However, those of ordinary skill in the art will appreciate that the invention is not limited thereto. The present teachings may be utilized with other communications technologies such as TDMA or GSM without departing from the scope of the present teachings As discussed more fully below, in the preferred embodiment, a GPS assisted arrangement is employed by which GPS overhead data is received by the base station 20' and transmitted to the mobile unit 30 to shorten acquisition time. In addition, the unit 30 is adapted to receive a signal from an airborne platform as well as from a satellite based platform. In any case, position location data is transmitted by the transceiver 38 to the base station 20' shown in FIG. 4.

Figure 4:
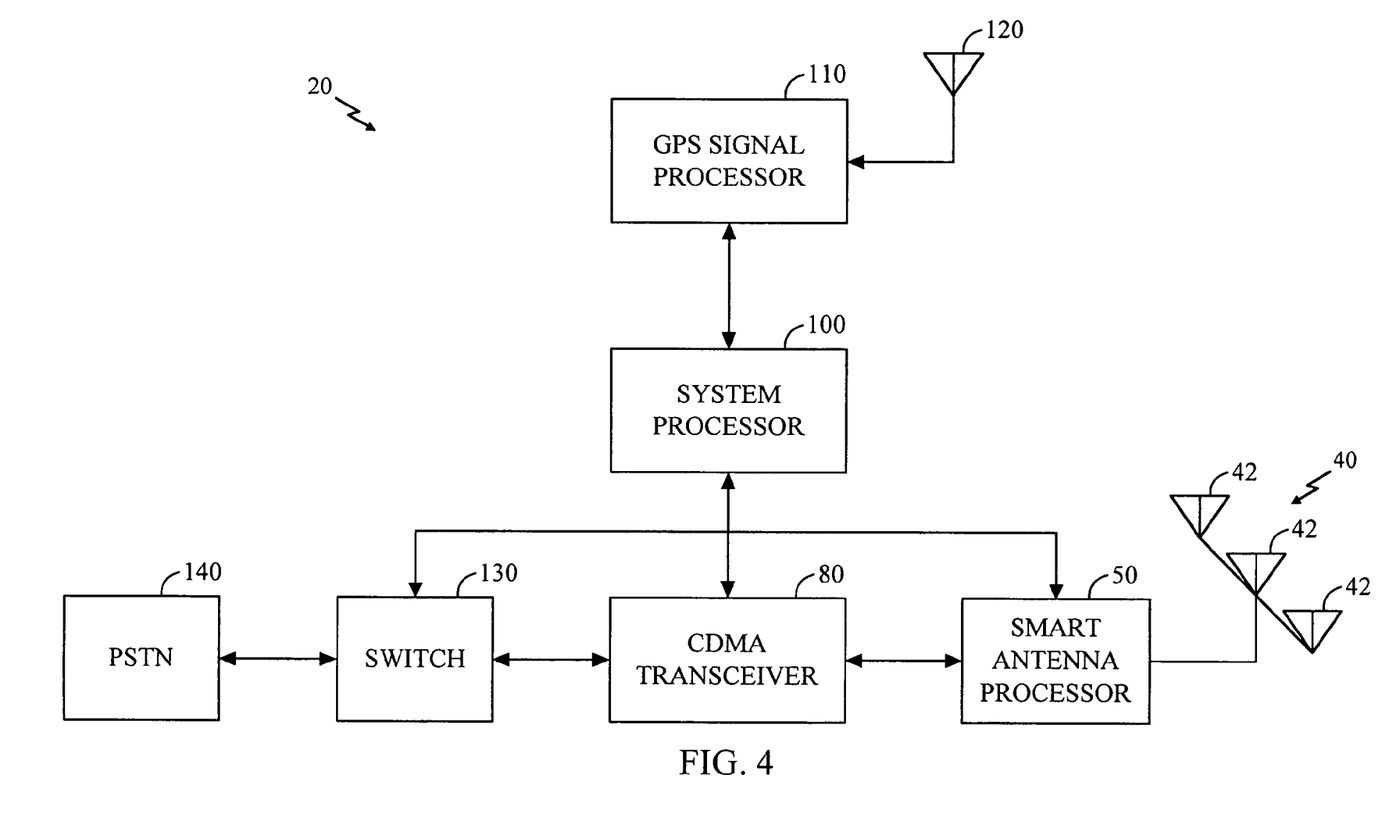
FIG. 4 is a simplified block diagram of a base station in accordance with the presently disclosed method and apparatus, a public switched telephone network (PSTN), and a switch.
Figure 5:
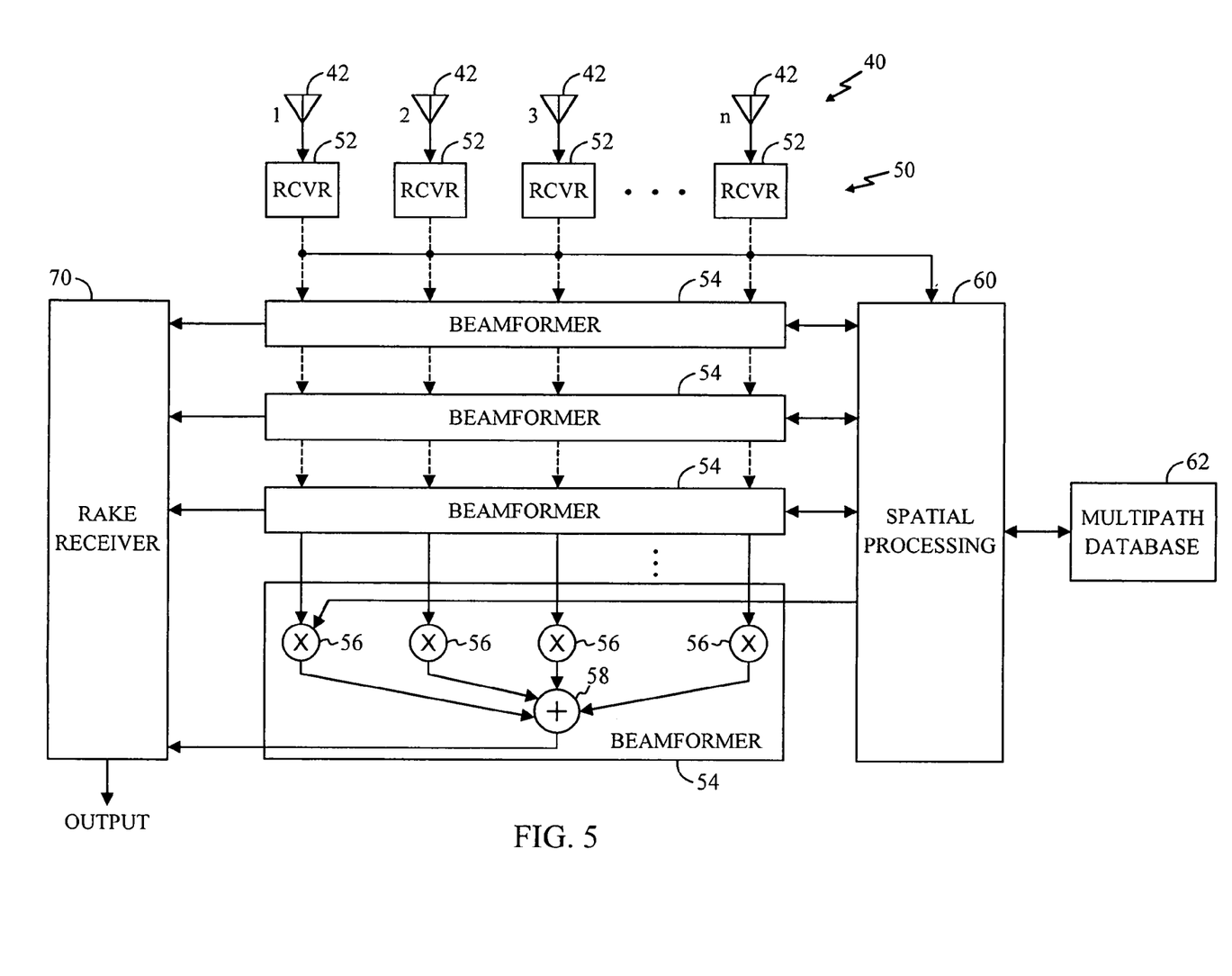
FIG. 5 is a simplified block diagram of the smart antenna.

FIG. 4 is a block diagram of an illustrative implementation of a base station in accordance, with the teachings of the present invention. As shown in FIG. 4, the base station 20' includes a smart antenna array 40 of spatially localized radiating elements 42. The array 40 may be of a conventional phased array antenna design. In the preferred embodiment, the array 40 is part of a Smart Antenna system and feeds a smart antenna processing circuit 50. As shown in FIG. 5, the processing circuit 50 includes a plurality of receivers 52, a number of beamforming elements 54, a spatial processor 60 and a Rake receiver 70.

Returning briefly to FIG. 4, a system processor 100 provides base station position data from a GPS signal processor 110 to the spatial processor 60. As discussed more fully below, the processor is programmed, in accordance with the present teachings, to utilize the position data provided by the user and the base station position data to steer the beams output by the array 40.

FIG. 5 is a block diagram of an illustrative embodiment of a smart antenna system incorporating the teachings of the present invention. As shown in FIG. 5, each of the n elements 42 of the antenna array 40 feeds an associated one of n receivers 52. In the illustrative embodiment, each receiver 52 downconverts and demodulates the signal received by the element 42 and performs matched filtering appropriate for a given user. Consequently, each receiver accepts a radio frequency (RF) input signal from an antenna element and processes it to output a baseband signal per each user.

Each receiver 52 is connected to all of the beamformers 54 and a spatial processing unit 60. The beamforming operation consists of multiplication and summing operations. The beamformer accepts each baseband signal from the receiver, performs a multiplication on the baseband signal and then sums these into a single signal. Hence, each beamformer 54 includes a multiplier 56 which multiplies the received baseband signal by a weight provided by the spatial processing unit 60. The multipliers 56 perform a complex multiplication. This operation is required for each beam. There are typically multiple beams per user and multiple users. The actual beam is formed by summing the complex-multiplied samples with an adder 58 in each beamformer 54.

The summed signals are supplied to the rake receiver 70. The rake receiver 70 accepts the outputs of the beamformers, delays and combines these signals in an optimal fashion. This operation takes place under the control of the spatial processing unit 60 for each I and Q sample. The spatial processing unit 60 is responsible for determining the characteristics of the beams to be formed. The spatial processing unit 60 implements an advantageous beamforming algorithm in accordance with the present teachings as discussed more fully below.

For a CDMA based system, an optimal beamforming solution, from a user capacity perspective, is achieved by maximizing the Signal-to-Noise-plus-Interference Ratio. Utilizing typical methods such as the "Optimal Wiener Solution" results in added complexity, cost and potential time delays within the system. In many cases a "near optimal" solution can be achieved with the present teachings, requiring far less complexity, cost and time delay. This is illustrated with respect of FIGS. 1, 6, and 7.

FIG. 1 is a flow diagram of a beamforming algorithm implemented in accordance with conventional teachings based on a Minimum Mean Squared Error Algorithm. As illustrated in FIG. 1. the process 100 includes the steps of acknowledging user access of the system at step 110 and generation of a pilot signal in response thereto at step 120. At step 130 a received signal vector is sampled and, at step 140, used to create an equation of the beamformer output. At step 150, an error function is created between the pilot signal and the beamformer output. Next, at step 160, the error function is minimized using the Wiener-Hopf equation or the Optimum Wiener solution. Finally, at step 170, optimized weights are applied to the beamformer. Unfortunately, the calculation of the weights involves the calculation of eigenvalues and other linear algebra operations which require numerous processor operations.

In accordance with the present teachings, these problems are obviated by using user position data and (local terrain data) to determine beamformer weights. The method is the present invention is best illustrated with reference to FIG. 7.

Figure 6:
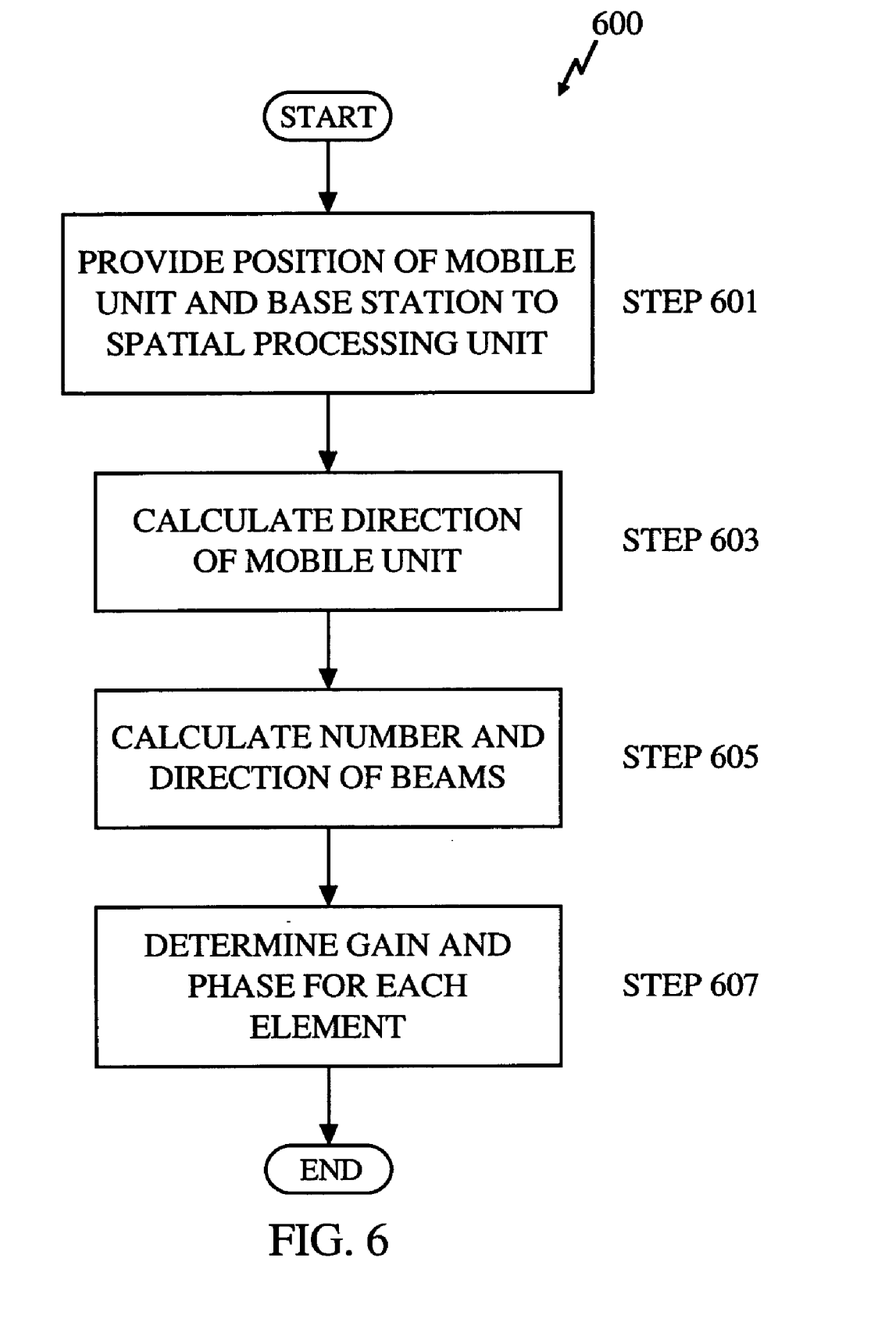
FIG. 6 is a flow diagram of an algorithm used to form beams.
Figure 7:
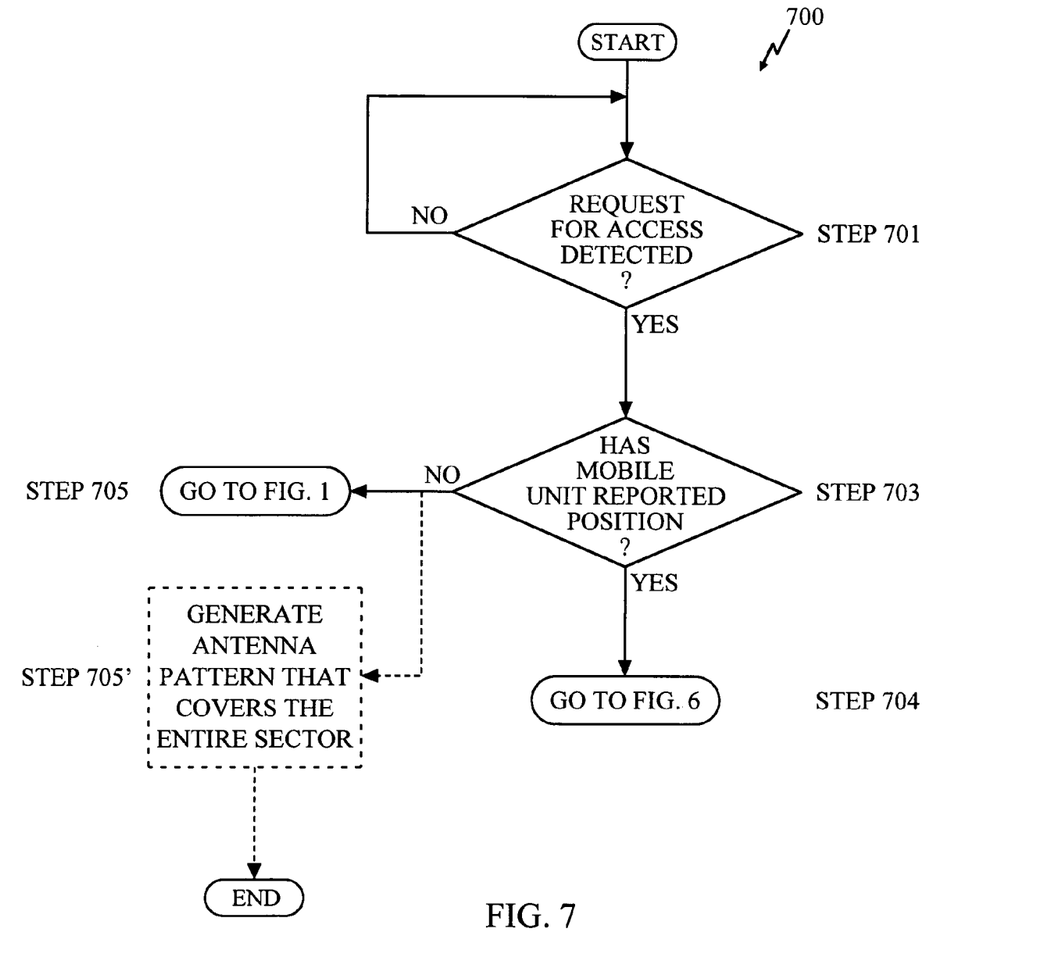
FIG. 7 is a flow diagram of a spatial processing method.

FIG. 7 is a flow diagram illustrative of the spatial processing method utilized by the method for directing narrow beams of the present invention. The novel method 700 uses the user position data and, optionally, local terrain data to determine the beamformer weights and includes the step 701 of acknowledging user access of the system. If, at step 703, the user reports his position, then at step 704, the algorithm shown in FIG. 6 is used.

FIG. 6 is a flow diagram of an illustrative algorithm used to provide beamforming to a user reporting his position in accordance with the teachings of the present invention. At step 601 the user's position and the position of the base station 20 are provided to the spatial processing unit 60 (FIG. 5) which, at step 603 calculates the direction of the user with respect to the base station. Those skilled in the art will appreciate that the present teachings are not limited to the manner by which the user's position is determined. Other techniques may be used to determine user and base station position without departing from the scope of the present teachings. The direction of the user is calculated by converting the GPS coordinate data to beamforming coordinate data and by using trigonometric techniques well-known to those skilled in the art.

Next, at step 605, the number and direction of the beams is calculated using information supplied by an optional multipath database 62 shown in FIG. 5.

The data base could be either based on analysis of the surroundings, or a measurement is performed. Measured data is assumed to be more accurate. A mobile would be driven throughout the coverage area. Mobile position and angle of arrival of the energy would be logged. This data would be used to create the multipath database. Finally, at step 607, the gain and phase of the antenna pattern is determined using antenna array characteristics supplied at step 605.

Returning to FIG. 7, at step 703, if the user does not report his location, the system uses an algorithm that generates a pattern that covers the entire sector (step 705').

Returning to FIG. 4, the output of the smart antenna processor 50 is input to a transceiver 80 of design and construction compatible with the transceiver 38 of the mobile unit 30. The transceiver 80 communicates with an external network such as a Public Switched Telephone (PSTN) 140 via a bi-directional switch 130.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. A method for beamforming by a base station, the method comprising:
    providing a mobile station's coordinate position to a spatial processing unit;
    providing a base station's coordinate position to the spatial processing unit;
    calculating a direction of the mobile station with respect to the base station according to the mobile station's coordinate position and the base station's coordinate position;
    calculating a number and a direction of beams according to information supplied by a multipath database that includes records of mobile station's coordinate position and corresponding angle of arrival of energy; and
    determining a gain and a phase of each element of an antenna according to the number and the direction of beams.

2. A base station comprising:
    means for providing a mobile station's coordinate position to a spatial processing unit;
    means for providing a base station's coordinate position to the spatial processing unit;
    means for calculating a direction of the mobile station with respect to the base station according to the mobile station's coordinate position and the base station's coordinate position;
    means for calculating a number and a direction of beams according to information supplied by a multipath database that includes records of mobile station's coordinate position and corresponding angle of arrival of energy; and
    means for determining a gain and a phase of each element of an antenna according to the number and the direction of beams.

3. A base station comprising:
    a processor for providing a mobile station's coordinate position and the base station's coordinate position a spatial processing unit;
    a spatial processing unit for calculating a direction of the mobile station with respect to the base station according to the mobile station's coordinate position and the base station's coordinate position, for calculating a number and a direction of beams according to information supplied by a multipath database that includes records of mobile station's coordinate position and corresponding angle of arrival of energy, and determining a gain and a phase of each element of an antenna according to the number and the direction of beams.

* * * * *